United States Patent Office 3,430,755
Patented Mar. 4, 1969

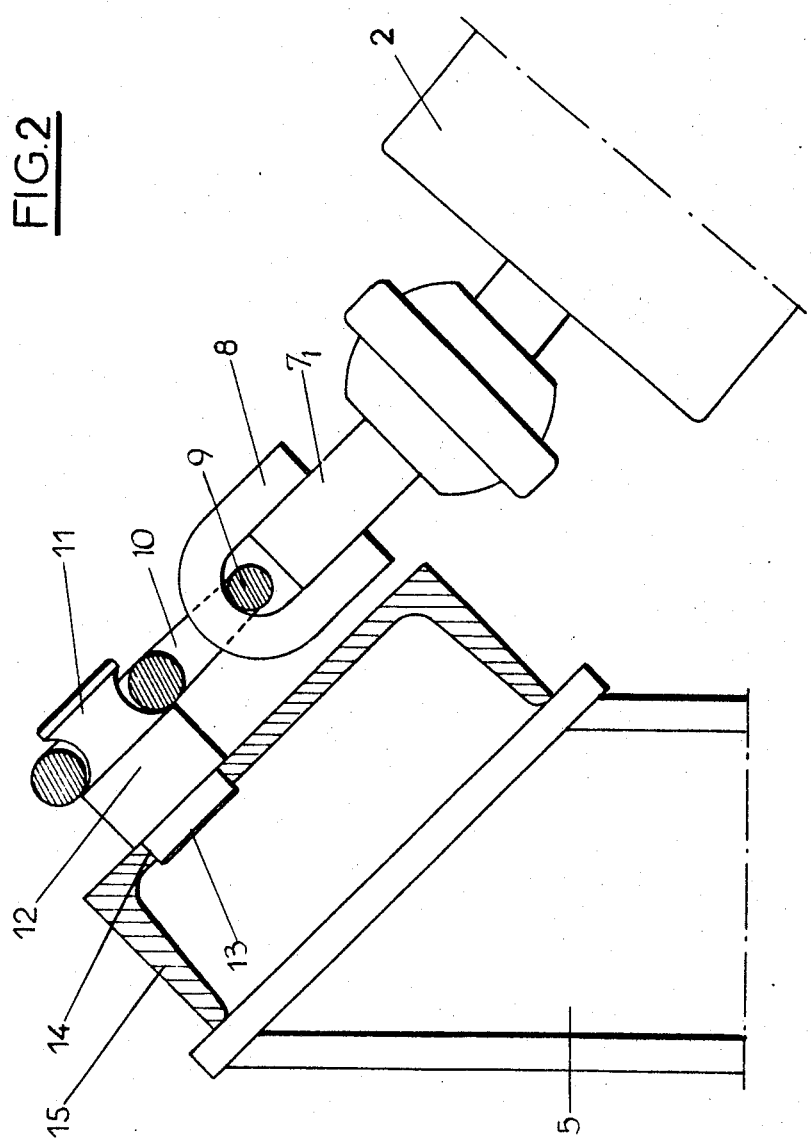

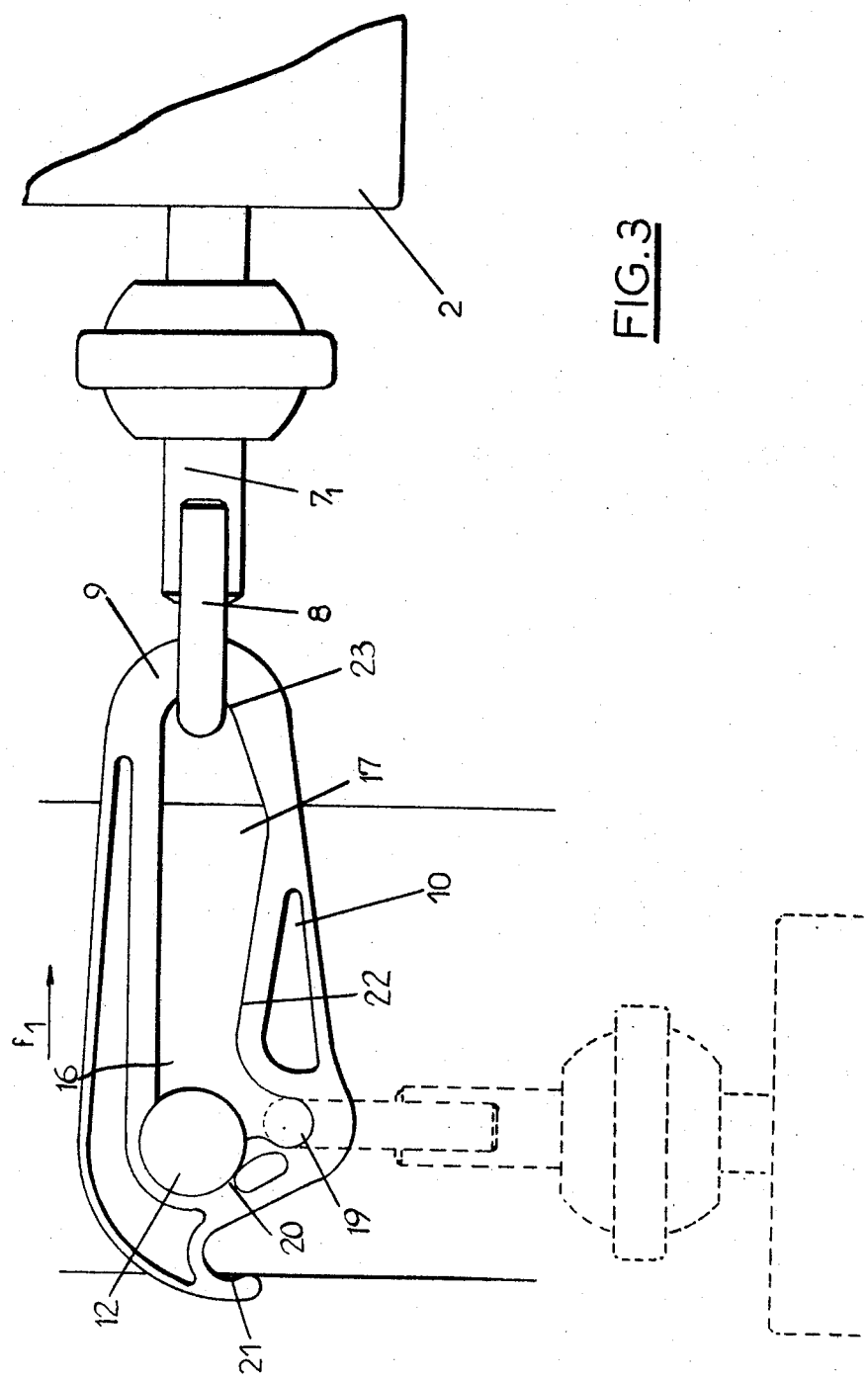

3,430,755
FASTENING DEVICE FOR TROUGHING ROLL
AND CONVEYOR BELTS HAVING SAID
FASTENING DEVICE
Marcel Allendorf, Saverne, France, assignor to Precismeca
S.A., Saverne, France, a company of France
Filed May 22, 1967, Ser. No. 640,097
Claims priority, application France, May 23, 1966,
62,562
U.S. Cl. 198—192                3 Claims
Int. Cl. B65g 15/08, 15/40

ABSTRACT OF THE DISCLOSURE

Fastening device for troughing rolls of conveyor belts characterised by the fact that it is oscillatory and comprises between the troughing roll and the frame a pivoted connection absorbing the torsion effects of the troughing roll on the frame caused by the oscillation of the troughing roll.

---

Fastening devices for the troughing rolls of conveyor belts are already known. These devices are intended to make the troughing roll integral with the framework of the conveyor, this framework being either a metallic stand or a cable or the like.

However these fastening devices have a major drawback in that the link between the framework and the troughing roll is rigid. The movement of the conveyor belt and the weight of the transported material exert on the troughing roll a certain traction directed in the direction of motion of the conveyor belt. This traction is variable and is proportional to the weight of the material. However the weight is not uniformly distributed on the belt and owing to this, the troughing rolls are subjected to a certain oscillation transmitted to the fastening devices. In order to avoid deterioration of the fastening device owing to said oscillatory tendency, the fastening devices must be very solid.

The present invention has for its object to remedy this drawback and proposes to provide a fastening device for troughing rolls of conveyor belts which is at least as solid as the already known fastening device but which also permits the absorption of the oscillations caused on the one hand by the non-uniformity of the weight of the transported material and on the other hand by the movements of the conveyor belt.

To this effect, the invention is concerned with a fastening device for troughing rolls of conveyor belts characterised in that the same oscillates.

According to the characteristic of the invention, the fastening device comprises between the troughing roll and the framework a pivoted link.

According to another characteristic of the invention, the pivoted link comprises a pivot integral with the frame.

According to another characteristic of the invention, the pivot integral with the frame comprises a friction groove.

According to another characteristic of the invention, the pivoted link comprises a link espousing the bottom of the friction groove.

According to another characteristic of the invention, the troughing roll comprises a shackle threaded in the link.

The invention includes the above mentioned characteristics and their various possible combinations.

The invention will be better understood by referring to the following description made by way of non-limiting example and to the accompanying drawing in which:

FIGURE 2 is a front view of the fastening device.

FIGURE 3 is an underneath view of the fastening device.

Figure 1:
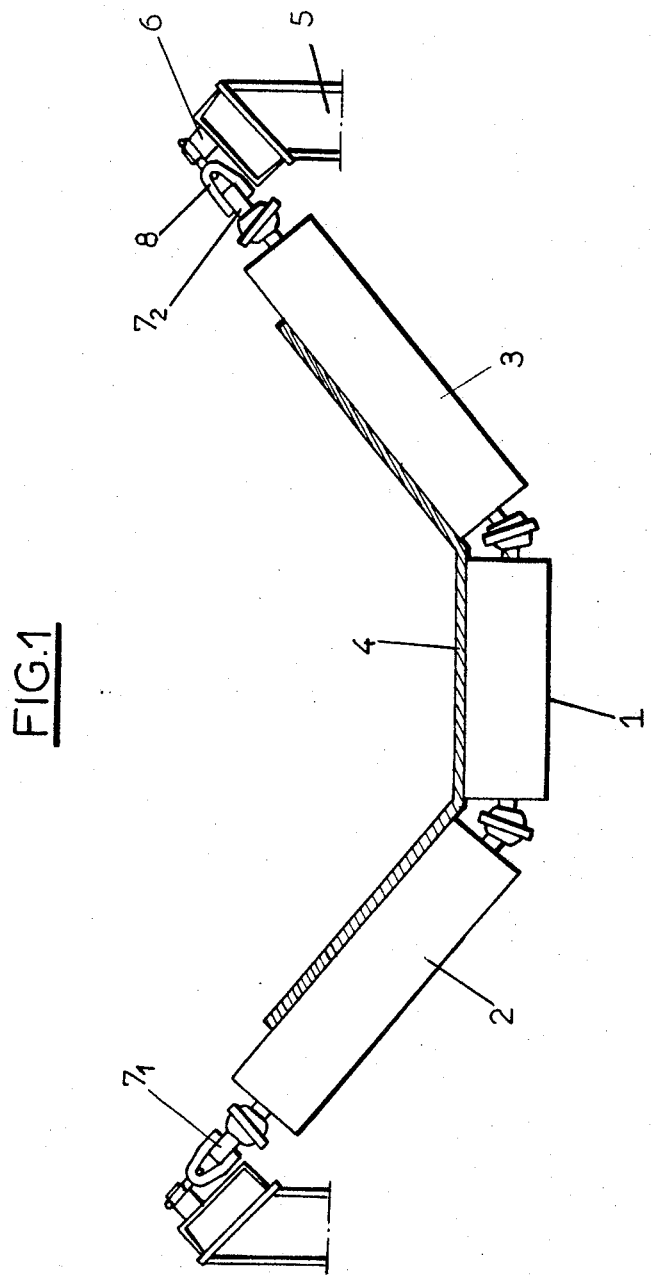
FIGURE 1 shows a troughing roll for conveyor belts hooked to a frame by means of the fastening device according to the invention.

Referring to FIGURE 1, the troughing roll comprises one or several horizontal conveyor rolls 1 and inclined rolls 2 and 3. On these rolls 1, 2 and 3 moves the conveyor belt 4.

The troughing roll is secured to the longitudinal frame 5 by fastening device 6.

The extremities of the end shafts $7_1$ and $7_2$ have a shackle 8. Shackle 8 straddles the rim 9 of a link 10.

The securing of shackle 8 on the end of shaft 7 occurs after hooking the shackle 8 to link 10.

The rim 9 of link 10 slides in a groove 11 made in a pivot 12, the groove 11 having a semi-toroidal cross-section.

The end 13 of pivot pin 12 is engaged in opening 14 in support 15 rigid with longitudinal frame 5 (see FIGURE 2).

To assemble, pivot 12 is engaged in the central window 16 of link 10. The central window 16 has an enlargement 17 permitting the passage of head 18 of pivot 12. The central window 16 is provided with a slot 19 in which is placed the shackle 8. The link is pushed along arrow $f_1$ in such a way that pivot 12 can take support against extremity 20 of the central window 16. The troughing roll occupies the position shown in dotted lines on FIGURE 3.

There is engaged in the eyelet 21 made at the end of link 10 a key forming a lever. The link 10 is pivoted around pivot 12. Shackle 8 slides along flank 22 beyond window 16 to locate itself at the end of its course at the opposite end 23 of window 16. The troughing roll occupies after assembly, the position shown n full lines on FIGURE 3. The troughing roll oscillates round pivot 12 and owing to this fact the torsion existing between the oscillating troughing roll and the fixed frame is eliminated.

Although the invention has been described with respect to a particular embodiment thereof, it will be understood that the same is in no way limited thereto and that there can be brought to it various modifications of shape and materials without thereby departing from the spirit and scope of the invention.

What is claimed is:

1. Fastening device for securing one end of the shaft of an inclined roll of a troughing roll to a fixed frame having a support comprising pivoting means secured to said support, a link having one end oscillable around said pivoting means, a shackle about the other end of said link and secured to said end of said shaft, said pivoting means further consisting of a pivot pin having a semi-toroidal peripheral groove, and said link having a rim engaged in said groove.

2. Device according to claim 1, wherein said pivot pin has a head and said link has an elongated slot provided, at one end, with an enlarged section for permitting passage of said head during mounting, and, at the other end, with a recess adapted to receive a shackle.

3. Device according to claim 2, wherein said link has an eyelet near said recess to facilitate assembly thereof.

References Cited
UNITED STATES PATENTS
3,089,580   5/1963   Dilgard _____ 198—192

RICHARD E. ALGERTER, *Primary Examiner.*